(12) United States Patent
Orritt et al.

(10) Patent No.: US 8,944,840 B2
(45) Date of Patent: Feb. 3, 2015

(54) LAMP CONNECTOR HAVING A RETAINER WITH A THREADED PORTION AND A RIDGE WITH AN APERTURE

(75) Inventors: Chris Orritt, Wigan (GB); Richard Joshi, Wigan (GB)

(73) Assignee: ATG R&D Limited, Wigan (GB)

( * ) Notice: Subject to any disclaimer, the term of this patent is extended or adjusted under 35 U.S.C. 154(b) by 0 days.

(21) Appl. No.: 13/537,509

(22) Filed: Jun. 29, 2012

(65) Prior Publication Data

US 2013/0017708 A1    Jan. 17, 2013

Related U.S. Application Data

(60) Provisional application No. 61/504,142, filed on Jul. 1, 2011.

(51) Int. Cl.
| | | |
|---|---|---|
| H01R 13/627 | (2006.01) | |
| H01R 33/97 | (2006.01) | |
| H01R 13/622 | (2006.01) | |
| H01R 13/639 | (2006.01) | |
| F21V 23/06 | (2006.01) | |
| F21V 25/02 | (2006.01) | |

(52) U.S. Cl.
CPC ............. *H01R 33/97* (2013.01); *H01R 13/622* (2013.01); *H01R 13/639* (2013.01); *F21V 23/06* (2013.01); *F21V 25/02* (2013.01)
USPC ........................................................ 439/359

(58) Field of Classification Search
USPC ............................................. 439/360, 352–358
See application file for complete search history.

(56) References Cited

U.S. PATENT DOCUMENTS

| | | | | |
|---|---|---|---|---|
| 2,709,217 | A * | 5/1955 | McCluskey | 362/101 |
| 2,954,495 | A * | 9/1960 | Zeller | 313/136 |
| 3,316,524 | A * | 4/1967 | Pastor | 439/320 |
| 3,391,381 | A * | 7/1968 | Livingston | 439/607.41 |
| 5,707,252 | A * | 1/1998 | Meszaros | 439/320 |
| 2004/0052074 | A1 | 3/2004 | Wu | |

FOREIGN PATENT DOCUMENTS

EP        0940629 A2    9/1999

* cited by examiner

*Primary Examiner* — Chandrika Prasad
(74) *Attorney, Agent, or Firm* — Ronald J. Koch

(57) ABSTRACT

An improved lamp connector comprises a base, a first cooperating member, a retainer, and a second cooperating member having a bulbous female connector being larger in size than an aperture formed by the a ridge on the retainer. The first and second cooperating members are operatively connected via male and female connectors to energize a UV lamp connected to the distal portion of the first cooperating member. The UV lamp cannot be removed from its housing while energized because the second cooperating member must be detached from the first cooperating member in order for the retainer to be removed. The retainer must be removed in order to remove the first cooperating member to gain access to the UV lamp.

2 Claims, 3 Drawing Sheets

LAMP CONNECTOR HAVING A RETAINER WITH A THREADED PORTION AND A RIDGE WITH AN APERTURE

CROSS REFERENCE TO RELATED APPLICATIONS

61/504,142

FEDERALLY SPONSORED RESEARCH

Not Applicable

SEQUENCE LISTING, TABLE, OR COMPUTER PROGRAM COMPACT DISK APPENDIX

Not Applicable

CLAIM OF PRIORITY BASED ON COPENDING APPLICATION claims benefit of provisional application number 61/504,142

The present application is related to the Provisional patent application Ser. No. 61/504,142 of Richard Joshi, et al, filed Jul. 1, 2011, entitled "Improved Lamp Connector", and based on which priority is herewith claimed under 35 U.S.C. 119(e) and the disclosure of which is incorporated herein by reference in its entirety as if fully rewritten herein.

BACKGROUND AND SUMMARY

The present invention relates generally to UV Lamp systems and specifically to electrical connecting means for said systems.

Conventional ultra-violet (UV) Lamp systems are problematic due to an unacceptably high risk of electrical shock, burn, and exposure to UV-C radiation inherent in the design of such systems. Removal of a UV lamp while energized exposes the operator to UV light radiation, extreme heat, and potential electrical shock.

Conventional solutions to the problem do not completely eliminate the inherent risks. One such system utilizes a large electrical enclosure with an access port. This system does not completely mitigate the risks because the access port could be carelessly left open. Another system utilizes a mechanical trip switch to de-energize the lamp upon removal. This system also fails to completely mitigate the risks because the switch can fail.

The present invention provides a solution to the foregoing problems completely mitigating the inherent risks wherein a retainer in conjunction with a bulbous electrical connector prevents an energized lamp from being removed from its housing. The lamp cannot be removed while energized.

REFERENCE NUMERALS IN DRAWINGS

Figure 1:
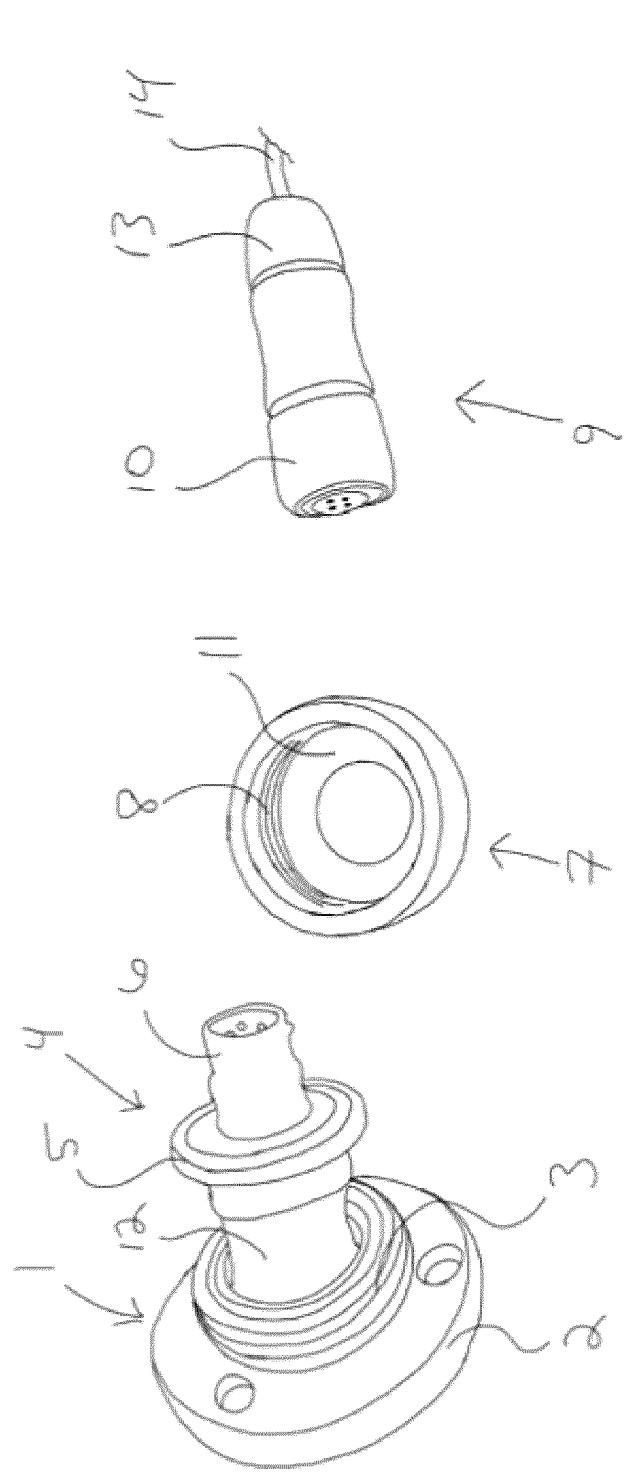
FIG. 1 depicts an exploded view of the invention.

The table below lists the reference numerals employed in the figures, and identifies the element designated by each numeral.
1 base 1
2 flange 2 of base 1
3 threaded portion 3 of base 1
4 first cooperating member 4
5 flange 5 of first cooperating member 4
6 male connector 6 of first cooperating member 4
7 retainer 7
8 threaded portion 8 of retainer 7
9 second cooperating member 9
10 female connector 10 of second cooperating member 9
11 ridge 11 of retainer 7
12 distal portion 12 of first cooperating member 4
13 distal portion 13 of second cooperating member 9
14 electrical conductors 14
15 locking thread 15 of first cooperating member 4
16 internal groove 16 of base 1

DETAILED DESCRIPTION

One embodiment of an improved lamp connector comprises, base 1, first cooperating member 4, retainer 7, and second cooperating member 9.

Base 1 has Flange 2 and threaded portion 3. Flange 2 mounts to a UV lamp housing (not shown). First cooperating member 4 has flange 5, male connector 6, and distal portion 12 at the end opposite male connector 6. Flange 5 abuts threaded portion 3 of base 1. Distal portion 12 is operatively connected to a UV lamp (not shown). Retainer 7 has threaded portion 8 and ridge 11. Ridge 11 forms an aperture smaller in size than flange 5 of first cooperating member 4.

Threaded portion 8 of retainer 7 operatively engages threaded portion 3 of base 1 such that ridge 11 of retainer 7 restricts first cooperating member 4 relative to base 1. Thus, a UV lamp (connected to distal portion 12 of first cooperating member 4) cannot be removed from its housing so long as retainer 7 is in place.

Second cooperating member 9 has female connector 10 and distal portion 13 located at the end opposite female connector 10. Electrical conductors 14 are operatively connected to female connector 10 of second cooperating member 9. Female connector 10 is somewhat bulbous relative to the aperture in ridge 11 of retainer 7 such that female connector 10 cannot fit through the aperture. First and second cooperating members 4 & 9, respectively, are operatively connected via male and female connectors 6 & 10, respectively, to energize a UV lamp connected to distal portion 12 of first cooperating member 4.

Figure 2:
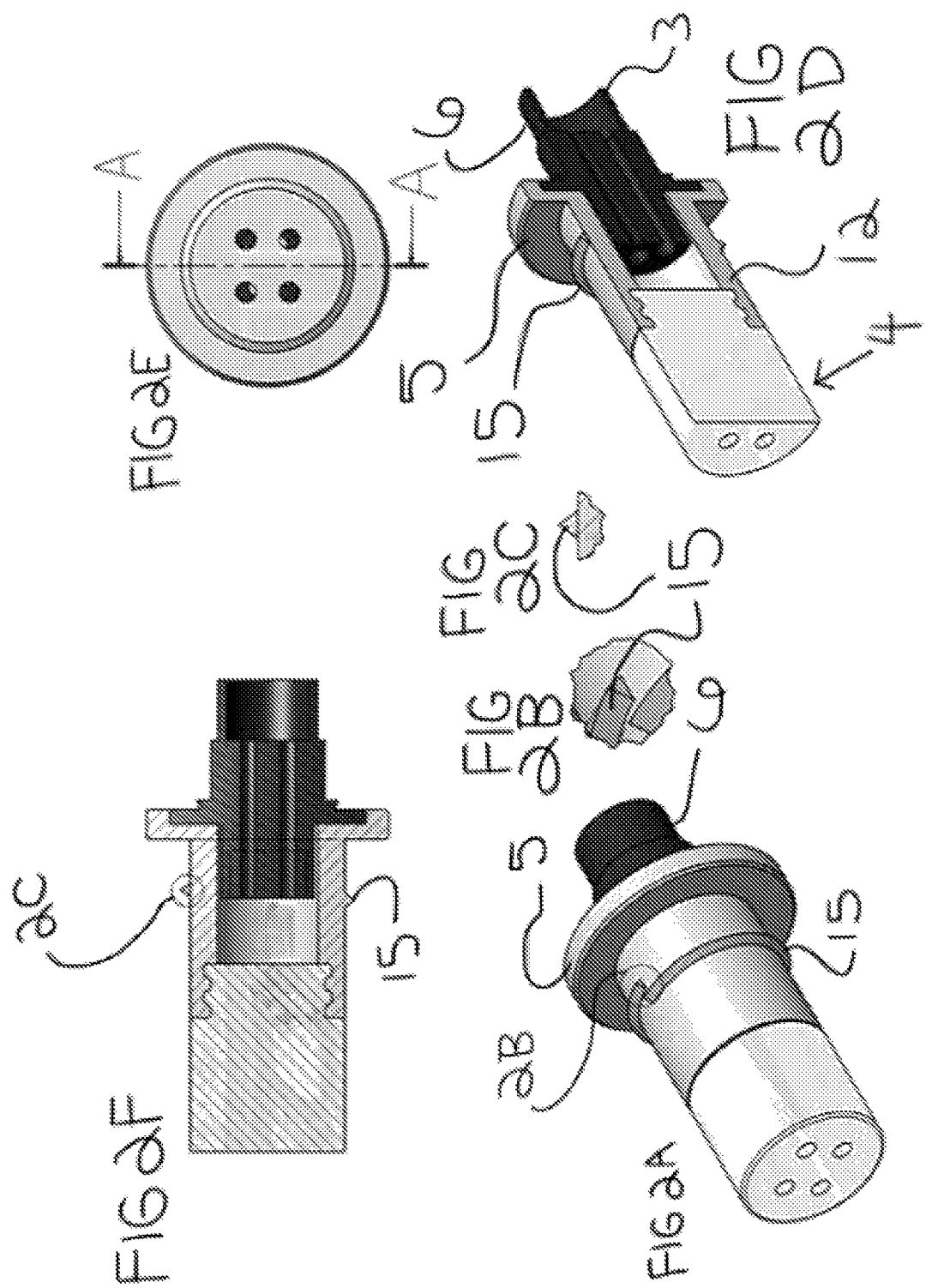
FIG. 2A depicts a perspective view of first cooperating member 4 in an alternative embodiment.
FIG. 2B depicts an enlarged view of FIG. 2A showing locking thread 15.
FIG. 2C depicts an enlarged view of FIG. 2F showing locking thread 15.
FIG. 2D depicts a cross sectional perspective view of first cooperating member 4 of FIG. 2A.
FIG. 2E depicts a rear view of first cooperating member 4 of FIG. 2A.
FIG. 2F depicts a cross sectional side view of first cooperating member 4 of FIG. 2A.
Figure 3:
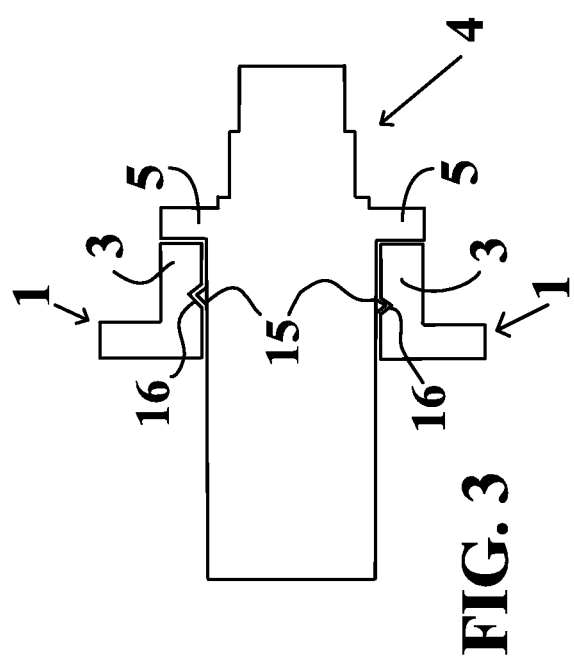
FIG. 3 depicts a cross sectional side view of first cooperating member 4 and base 1.

FIGS. 2A through 2F, & 3 depict an alternative embodiment of first cooperating member 4 and base 1 wherein locking thread 15 has a 3 mm pitch and is disposed about distal portion 12 in one complete revolution such that it engages internal groove 16 of base 1 (FIG. 3). Locking thread 15 must be fully formed at start and end as depicted in FIG. 2B. Internal groove 16 of base 1 is a M27×3 sized. Those of skill in the art will appreciate that locking thread 15 cooperatively engages internal groove 16 to removably secure first cooperating member 4 within base 1. This ensures that first cooperating member 4 cannot be extracted while a lamp (operatively connected to first cooperating member 4) is energized. To safely remove the lamp, second cooperating member 9 must be disengaged from first cooperating member 4, then retainer 7 must be removed from base 1, then first cooperating member 4 must be unscrewed from base 1.

What is claimed is:

1. An improved lamp connector comprising:
   a base having a flange and a threaded portion;
   a first cooperating member having a flange, and a male electrical connector;
   a retainer having a threaded portion and a ridge, the ridge having an aperture smaller in diameter than the outside diameter of the flange of the first cooperating member;
   and a second cooperating member having a bulbous female electrical connector being larger in diameter than the aperture formed in the ridge of the retainer;
   wherein the flange of the first cooperating member abuts an end of the threaded portion of the base;
   further wherein the threaded portion of the retainer operatively engages the threaded portion of the base such that the ridge of the retainer restricts axial movement of the first cooperating member relative to the base.

2. The improved lamp connector of claim 1 further comprising:
   a locking thread disposed about the distal portion of the first cooperating member in a helical pattern wherein the locking thread cooperatively engages an internal groove in the base whereby the first cooperating member is removably secured to the base.

\* \* \* \* \*